United States Patent
Khalid et al.

[11] Patent Number: 5,388,151
[45] Date of Patent: Feb. 7, 1995

[54] TECHNIQUE FOR REDUCING MESSAGE NOTIFICATION BLOCKAGE IN VOICE MAIL SYSTEMS

[75] Inventors: Zafar M. Khalid; Rachel Ramsay; Brian Tennant, all of San Jose, Calif.

[73] Assignee: Rolm Systems, Santa Clara, Calif.

[21] Appl. No.: 246,915

[22] Filed: May 20, 1994

Related U.S. Application Data

[63] Continuation of Ser. No. 955,530, Oct. 1, 1992, abandoned.

[51] Int. Cl.$^6$ .............................................. H04M 3/42
[52] U.S. Cl. ........................................ 379/67; 379/88; 379/89
[58] Field of Search ................. 379/45, 233, 266, 164, 379/157, 89

[56] References Cited

U.S. PATENT DOCUMENTS

| | | | |
|---|---|---|---|
| 4,783,796 | 11/1988 | Ladd | 379/214 |
| 4,792,967 | 12/1988 | Ladd | 379/233 |
| 4,980,906 | 12/1990 | Forson | 379/89 |
| 5,023,868 | 6/1991 | Davidson | 379/211 |
| 5,083,308 | 1/1992 | Gaulke | 379/266 |
| 5,175,761 | 12/1992 | Khalid | 379/233 |
| 5,195,126 | 3/1993 | Carrier | 379/45 |

OTHER PUBLICATIONS

"A Practical Guide to Voice Mail" by Martin F. Parker, Osborne McGraw-Hill, 1987, pp. 2-20 and 198-199.

"Voice Mail and Competing Services" by I. Gitman, Sep. 1985, in Computer Message Systems, edited by R. P. Uhlig, North Holland Publishing Co., pp. 405-410.

Primary Examiner—James L. Dwyer
Assistant Examiner—Michael N. Lau

[57] ABSTRACT

Method and apparatus are disclosed for dedicating one or more second lines interconnecting a public/private communication system (PCS), such as a Private Branch Exchange (PBX), and a Voice Mail System (VMS) for only providing message notification to communication devices of recipients of voicemail messages via the PCS. A plurality of analog first lines in a hunt group between the PCS and the VMS permit voice communications between callers and the VMS via the PCS. The VMS includes an applications processor which is integrated (coupled) to the PCS. The applications processor determines if a second line to be used only for message notification is part of the plurality of analog first lines in the hunt group. If the second line is part of the plurality of analog first lines, the applications processor accesses the PCS over the second line, and causes the second line to be made inaccessible to the public/private communication system for transmitting incoming calls to the Voice Mail System. When a second line is not part of the plurality of analog first lines, the applications processor accesses the PCS, and causes all incoming calls that are directed to the VMS over this second line to be forwarded to the plurality of analog first lines.

9 Claims, 2 Drawing Sheets

TECHNIQUE FOR REDUCING MESSAGE NOTIFICATION BLOCKAGE IN VOICE MAIL SYSTEMS

CROSS-REFERENCE TO RELATED APPLICATION

This is a continuation of Ser. No. 07/955,530 filed on Oct. 1, 1992 now abandoned.

FIELD OF THE INVENTION

The present invention relates to Voice Mail Systems (VMSs), and, more particularly, to a technique for providing message notification by a Voice Mail System by using dedicated lines for only message notification and automatic call diversion from such dedicated lines.

BACKGROUND OF THE INVENTION

In recent years communication systems have added many new services for consumer use. For example, a Voice Mail System is used to provide a voice messaging service to the called party when the called party is unavailable. More particularly, leaving a voice message for a called party is in widespread use in the case of a non-completed telephone call (e.g., where the called party is either busy or otherwise unavailable). Voice messages may in fact be more efficient than telephone conversations where participation of the two parties to a call is not really required to transfer simple information. Voice messaging can be considered a replacement for a human attendant who would otherwise be required to transcribe the message, or for a simple analog recording device (answering machine) that can be connected to a called telephone. In this regard see, for example, the book entitled "A Practical Guide to Voice Mail" by Martin F. Parker, Osborne McGraw-Hill, 1987 at pages 2-20 and 198-199; and the article entitled "Voice Mail and Competing Services" by Dr. I. Gitman in *Computer Message Systems*, edited by R. P. Uhlig, Proceeding of the IFIP TC-6 International Symposium On Computer Message Systems, Washington, D.C., 5-7 Sep. 1985, North Holland Publishing Co., at pages 405-410.

In current Voice Mail Systems (VMSs) interconnecting a Private Branch Exchange (PBX) with the VMS using voice lines in a hunt group, the VMS activates or deactivates message notification on the message recipient's telephone coupled to the PBX by dialing appropriate codes over one of the voice lines in the hunt group. These voice lines in the hunt group share the load of both incoming calls to the VMS and outgoing message notification calls from the VMS. During peak incoming traffic hours, this creates an undesirable effect of delaying the message notification since the voice lines in the hunt group are occupied by incoming calls for a majority of the time. This delayed message notification situation is unacceptable to many VMS users. Therefore, it is desirable to provide a simple and inexpensive technique for reducing message notification blockage to message recipients of a VMS.

SUMMARY OF THE INVENTION

The present invention is directed to method and apparatus for achieving minimal message notification blockage in a Voice Mail System (VMS) to message recipient extensions on a Private Branch Exchange (PBX) which is integrated with the VMS.

The method of reducing message notification blockage in a Voice Mail System which is integrated with a public/private communication system such as a Private Branch Exchange to a message recipient's extension on that public/private communication system comprises the following steps in accordance with the present invention. In a first step, a line connecting the Voice Mail System with the public/private communication system is identified by the Voice Mail System. In a second step, the line identified in the first step is dedicated for use in only providing message notification to recipients of a voicemail message received at the Voice Mail System. In a third step, the first and second steps are repeated for only those lines connecting the Voice Mail System with the public/private communication system which are to be dedicated for use in only providing message notification to recipients of voicemail messages.

The apparatus comprises a Voice Mail System comprising an applications processor, a public/private communication system including a plurality of analog first lines in a hunt group which interconnect the public/private communication system and the Voice Mail System, and at least one second line interconnecting the Voice Mail System and the public/private communications system. The at least one second line interconnecting the Voice Mail System and the public/private communications system is dedicated for only providing a notification by the Voice Mail System of a receipt of a voicemail message at the Voice Mail System to a communication device at a voicemail message recipient's location via the public/private communication system.

The invention will be better understood from the following more detailed description taken with the accompanying drawings and claims.

DETAILED DESCRIPTION

Figure 1:
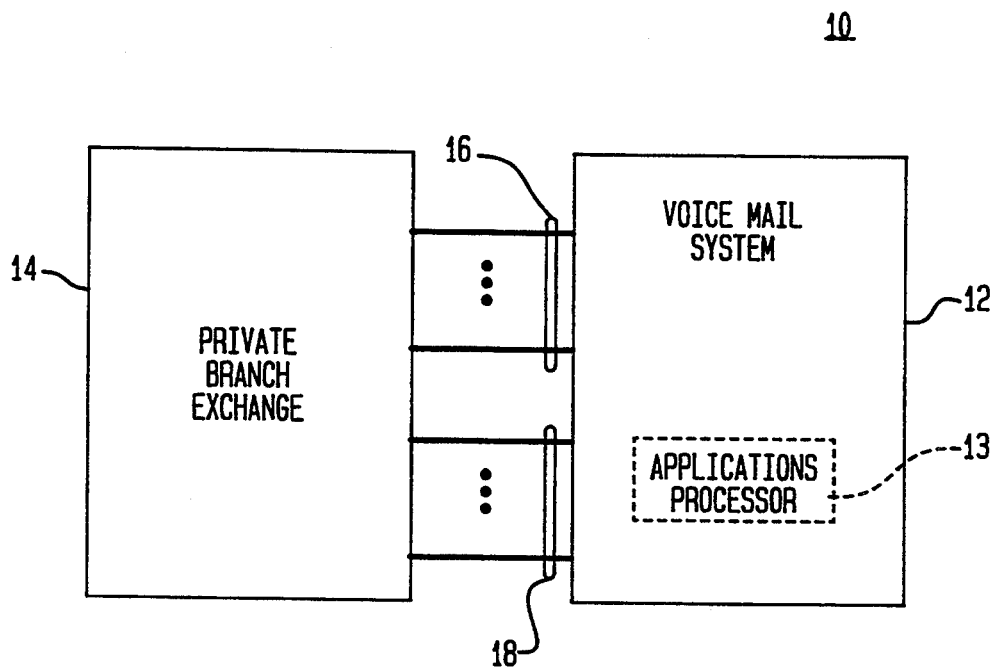
FIG. 1 shows a block diagram of a system comprising a Voice Mail System which is integrated with a Private Branch Exchange in accordance with the present invention.

Referring now to FIG. 1, there is shown a system 10 in accordance with the present invention. System 10 comprises a Voice Mail (or Voice Messaging) System (VMS) 12 which is integrated with (coupled to) a Private Branch Exchange (PBX) 14 via a plurality of analog first lines 16 arranged in a hunt group, and a plurality of second lines 18 (with only the first and last lines shown) which are dedicated to only providing message notification to recipients of voicemail messages in accordance with the present invention. It is to be understood that the plurality of second lines 18 can comprise just one second line 18 but preferably comprise a plurality of second lines 18. In addition, the second lines 18 can also be part of the hunt group comprising the first lines 16. The Voice Mail System 12 comprises an applications processor 13 (shown within a dashed line rectangle) for directing the actions of the Voice Mail System 12. The integration (coupling) between the VMS 12 and the PBX 14 is achieved through inband tone signaling which passes any phone call information as, for example, the "Called Extension", the "Calling Extension", and the "Reason for the Call", from the PBX 14 to the Voice Mail System 12. This call information is received by the applications processor 13 and is used by the VMS 12 to provide intelligent service to a caller. It is to be understood that the applications processor 13 of the Voice Mail System 12 is a well known element that comprises, for example, a computer or microcomputer (not shown) coupled to peripheral devices such as a memory (not shown) that stores (a) appropriate application programs for performing defined tasks, and (2) fixed and temporary type data.

In the system 10, voice paths to the Voice Mail system 12 are provided from the PBX 14 over the analog first lines 16. An analog first line 16 is used by the Voice Mail System 12 at any instant of time to communicate with a calling party in order to permit the calling party to leave a message for a called party in a correct mailbox associated with the called party (recipient).

Upon receipt of a voicemail message for a recipient called party, an indication that a voicemail message has been received is provided to the recipient called party. To provide such indication, the Voice Mail System 12 sends a message notification signal to the recipient's telephone or workstation (not shown) via one of the second lines 18 which is dedicated for providing message notifications in accordance with the present invention. The reservation of the second line 18 for message notification purposes only is achieved by the applications processor 13 transmitting a predetermined feature code over an accessed second line 18 to the PBX 14. This predetermined feature code automatically causes the PBX 14 to divert any incoming calls on the second lines 18 to the first lines 16.

More particularly, incoming calls to the Voice Mail System 12 are prevented from being sent on the one or more second lines 18 by manually activating an "Immediate Call Forward" or a "Do Not Disturb" feature on each of the second lines 18. The drawback of such arrangement is that, if the PBX 14 loses the activated features on a power failure, a human operator must activate these features by manually attaching dialing equipment to these lines. This a very inconvenient and inefficient process.

To overcome the aforementioned problem, in a preferred arrangement, the dialing sequence required to achieve the "Call Forward Immediate" or the "Do Not Disturb" feature on the one or more second lines 18 associated with the PBX 14 to a predetermined destination is stored in the memory (not shown) of the applications processor 13 of the Voice Mail System 12. Each time the Voice Mail System 12 is brought on-line, the first thing the Voice Mail System 12 does is to automatically dial the stored dialing sequence on the designated one or more second lines 18. This achieves automatic and error free feature activation at the start-up time of the Voice Mail System 12. Normally, when the PBX 14 loses electric power, the Voice Mail System 12 also loses electric power. Therefore, on recovery of electric power to the PBX 14 and the Voice Mail System 12, the Voice Mail System 12 automatically sets the correct PBX 14 station features. It is to be understood that the plurality of analog first lines 16 and the plurality of second lines 18 can be formed in separate hunt groups or as part of a single hunt group connecting the PBX 14 and the Voice Mail System 12. Where the arrangement has only a single hunt group for lines 16 and 18, the Voice Mail System 12 activates the "Do Not Disturb" feature only on the one or more second lines 18.

Figure 2:
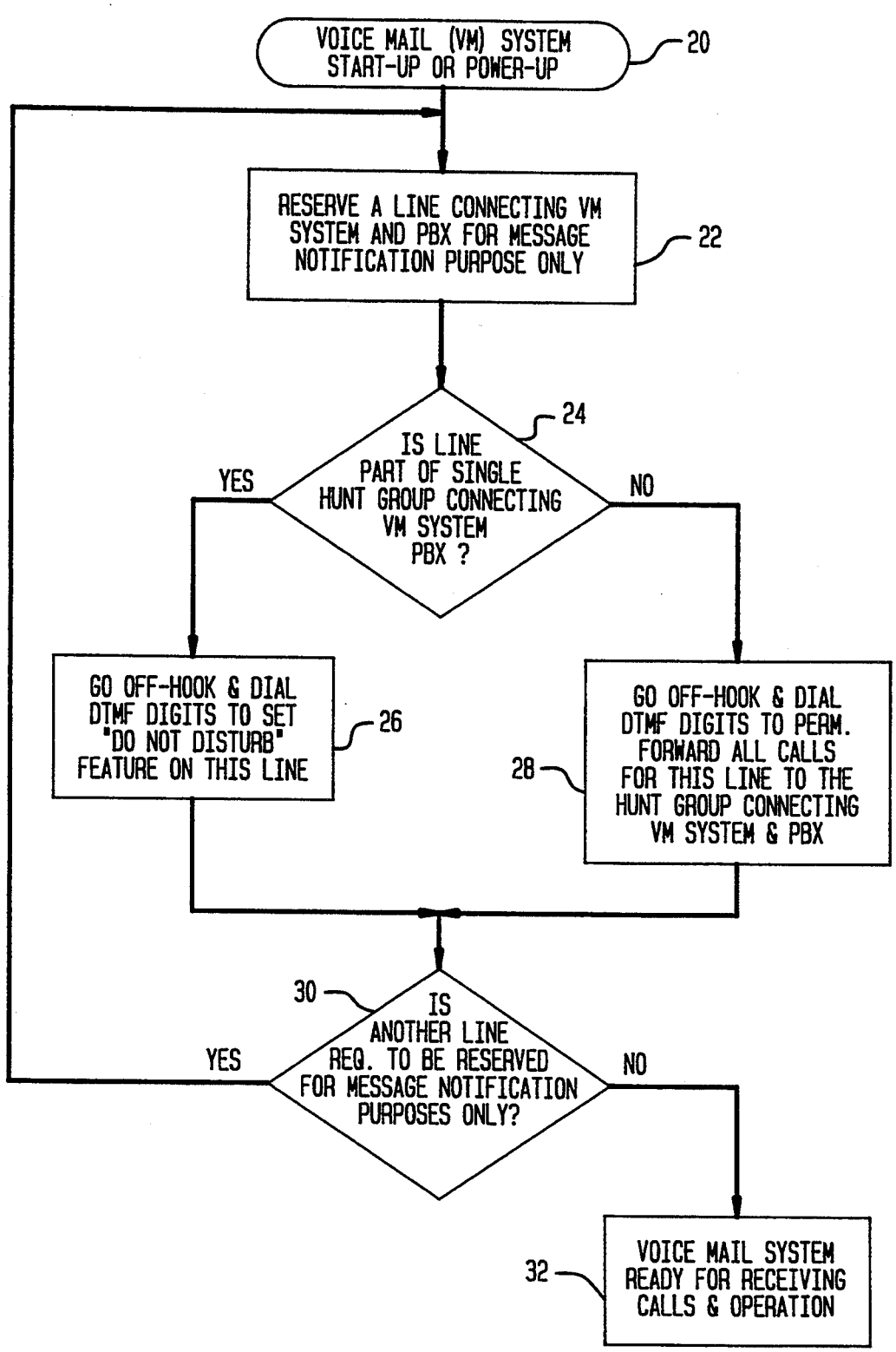
FIG. 2 shows a flow diagram of steps for initializing the system of FIG. 1 on start-up or power-up for providing at least one line which is dedicated for only providing message notifications to message recipients by the Voice Mail system of FIG. 1 in accordance with the present invention.

Referring now to FIG. 2, there is shown a flow diagram of steps for initializing the system 10 of FIG. 1 on start-up or power-up for providing one or more second lines 18 which are dedicated for only providing message notifications to message recipients by the Voice Mail System 12 of FIG. 1 in accordance with the present invention. More particularly, in a first step shown in block 20, the Voice Mail System 12 is placed in a start-up or power-up mode by either an operator or upon a power failure recovery. At this time, the applications processor 13 (shown only in FIG. 1) determines the number of second lines 18 (shown only in FIG. 1) required to be reserved just for use for message notification purposes. This is done by accessing a configuration database stored in, for example, the memory of the Voice Mail System 12. In a second step shown in block 22, the applications processor 13 of the Voice Mail system 12 reserves a second line 18 connecting the Voice Mail System 12 and the PBX 14 (shown only in FIG. 1) to be used for message notification purposes only.

In a third step shown in block 24, the Voice Mail System 12 determines the configuration of the lines 16 and 18. If it is determined that the reserved second line 18 is part of the single hunt group, then the sequence of steps proceeds via a "Yes" decision path from block 24 to a block 26. As shown in block 26, the Voice Mail System 12 goes off-hook on the second line 18 being reserved in block 22, waits for dial tone being returned from the PBX 14, and then dials a predetermined Dial Tone Multi-Frequency (DTMF) PBX feature code to activate the "Do Not Disturb" or a similar feature on that second line 18.

If it is determined that the reserved second line 18 is not part of the single hunt group associated with the first lines 16, then the sequence of steps proceeds via a "No" decision path from block 24 to a block 28. As shown in block 28, the Voice Mail System 12 goes off-hook on the second line 18 reserved in block 22, waits for dial tone being returned from the PBX 14, and then dials a predetermined DTMF feature code to activate, for example, an "All Call Forwarding" feature that forwards all calls from the reserved second line 18 to the first lines 16 of the hunt group. This ensures that all calls are forwarded on the first lines 16 instead of incoming calls being directed over the reserved second line 18.

The sequence of steps proceeds from either one of the blocks 26 and 28 to a block 30 where a determination is made of whether another second line 18 is required for dedication for message notification purposes only. If another second line 18 is required to be dedicated for message notification purposes only, the sequence proceeds via a "Yes" decision from block 30 to block 22 to reserve another second line 18 via blocks 22, 24, and 26 or 28. When all required second lines 18 for message notification purposes only have been processed as described hereinbefore, the sequence of steps proceeds via a "No" decision path from block 30 to a block 32 to place the Voice Mail System 12 in a ready state to receive incoming calls on lines 16, and operate normally.

It is to be appreciated and understood that the specific embodiments of the invention described hereinbefore are merely illustrative of the general principles of the invention. Various modifications may be made by those skilled in the art consistent with the principles set forth hereinbefore. It is to be understood that the present method and apparatus can be used in a Voice Mail System which is integrated with any other public or private communication system that is capable of using a similar technique as described hereinbefore for use with the PBX 14.

What is claimed is:

1. A method of reducing message notification blockage in a Voice Mail System which is connected by a switching system to a message recipient's extension on that switching system comprising the steps of:
 (a) identifying a line connecting the Voice Mail System with the switching system;
 (b) dedicating the line identified in step (a) for use in only providing message notification to recipients of a voicemail message received at the Voice Mail System by performing the substeps of:
  (b1) accessing the switching system with the line identified in step (a); and
  (b2) dialing a feature code used by the switching system for preventing incoming calls to the Voice Mail System from being sent over the line identified in step (a); and
 (c) repeating steps (a) and (b) for any other line connecting the Voice Mail System with the switching system to be dedicated for use in only providing message notification to recipients of voicemail messages.

2. The method of claim 1 wherein steps (a), (b), and (c) are automatically performed at the Voice Mail System during a start-up or power-up of the Voice Mail System and the switching system.

3. The method of claim 1 wherein the Voice Mail System comprises an applications processor, and in performing step (b1), performing the substeps of:
 determining by the applications processor if the line identified in step (a) is part of a plurality of lines in a hunt group connecting the switching system and the Voice Mail System or not; and
 accessing the switching system by the applications processor over the line identified in step (a); and
 and in performing step (b2), performing the substeps of:
  dialing a predetermined feature code to place the line identified in step (a) in a condition which indicates that the identified line is inaccessible to the switching system for transmitting incoming calls to the Voice Mail System in response to the identified line being determined in step (b1) as being pan of the plurality of lines in the hunt group.

4. The method of claim 1 wherein the Voice Mail System comprises an applications processor, and in performing step (b), performing the substeps of:
 determining by the applications processor if the line identified in step (a) is part of a plurality of lines in a hunt group connecting the switching system and the Voice Mail System or not; and
 accessing the switching system by the applications processor over the line identified in step (a); and
 and in performing step (b2), performing the substeps of:
  dialing a predetermined feature code which causes the switching system to forward all incoming calls to the Voice Mail System which are directed to the identified line to the plurality of lines in the hunt group when the identified line is determined in step (b1) to not be part of the plurality of lines in the hunt group.

5. Apparatus comprising:
 a Voice Mail System comprising an applications processor:
 a switching system comprising a plurality of analog first lines in a hunt group which interconnect the switching system and the Voice Mail System: and
 at least one second line interconnecting the switching switching system and the Voice Mail System which is dedicated for only providing a notification by the Voice Mail System of a receipt of a voicemail message at the Voice Mail System to a communication device at a voicemail message recipient's location via the switching system
 wherein the applications processor in the Voice Mail System comprises software which: (a) automatically accesses each of the at least one second line to receive dial tone from the switching system, and (b) upon receipt of the dial tone, transmits a predetermined feature code over each of the at least one second line to place each of the at least one second line in a condition which indicates that each of the at least second line is inaccessible to the switching system for transmitting incoming calls to the Voice Mail System.

6. The apparatus of claim 6 wherein on start-up or power-up of the switching system and the Voice Mail System, the applications processor automatically reserves each of the at least one second line for only providing a notifaction by the Voice Mail System of a receipt of a voicemail message to the recipient's communication device.

7. The apparatus of claim 5 wherein the plurality of analog first lines and each of the second lines are part of a single hunt group.

8. The apparatus of claim 5 wherein the plurality of analog first lines are in a hunt group, and the at least one second line is not part of that hunt group.

9. The apparatus of claim 8 wherein the applications processor in the Voice Mail System comprises software which (a) accesses the switching system over each of the at least one second line to receive dial tone, and (b) upon receiving dial tone, transmits a predetermined feature code over the second line to cause the switching system to forward all incoming calls to the Voice Mail System which are directed to the second line to the plurality of analog first lines in the hunt group.

* * * * *